US 9,887,507 B2

(12) United States Patent
Gerber

(10) Patent No.: US 9,887,507 B2
(45) Date of Patent: Feb. 6, 2018

(54) SENSOR SYSTEM WITH A ROTATABLE ELECTRICAL OUTLET

(71) Applicant: tecsis GmbH, Offenbach (DE)

(72) Inventor: Alexander Gerber, Mainaschaff (DE)

(73) Assignee: Tecsis GmbH, Offenbach (DE)

(*) Notice: Subject to any disclaimer, the term of this patent is extended or adjusted under 35 U.S.C. 154(b) by 0 days.

(21) Appl. No.: 15/172,706

(22) Filed: Jun. 3, 2016

(65) Prior Publication Data
US 2016/0359286 A1  Dec. 8, 2016

(30) Foreign Application Priority Data
Jun. 3, 2015  (DE) .......................... 10 2015 006 890

(51) Int. Cl.
H01R 39/00 (2006.01)
H01R 39/64 (2006.01)
G01D 11/24 (2006.01)

(52) U.S. Cl.
CPC ......... *H01R 39/643* (2013.01); *G01D 11/245* (2013.01)

(58) Field of Classification Search
CPC ........................... G01D 11/245; H01R 39/643
USPC .................... 439/13, 31, 913, 534; 73/756
See application file for complete search history.

(56) References Cited

U.S. PATENT DOCUMENTS

| | | | | |
|---|---|---|---|---|
| 5,315,232 A | * | 5/1994 | Stewart | G01R 29/12 324/457 |
| 6,570,304 B1 | * | 5/2003 | Okazaki | G01L 23/22 313/118 |
| 8,636,532 B2 | * | 1/2014 | Masuda | G01N 27/4062 204/426 |
| 8,887,585 B2 | * | 11/2014 | Furniss | G01L 1/20 73/862 |
| 2002/0089142 A1 | * | 7/2002 | Lukac | A01B 51/026 280/93.512 |
| 2004/0102060 A1 | * | 5/2004 | Schauz | H01R 13/622 439/13 |
| 2007/0109108 A1 | * | 5/2007 | Chen | B60R 25/1004 340/426.24 |
| 2007/0157371 A1 | * | 7/2007 | Nagely | A42B 3/0473 2/410 |
| 2009/0095062 A1 | * | 4/2009 | Warren | H01T 13/58 73/114.62 |
| 2015/0191972 A1 | * | 7/2015 | Malekpour | E06B 9/36 160/1 |
| 2015/0280384 A1 | * | 10/2015 | Leimbach | B25F 5/00 227/175.1 |
| 2016/0359286 A1 | * | 12/2016 | Gerber | G01D 11/245 |

* cited by examiner

*Primary Examiner* — Abdullah Riyami
*Assistant Examiner* — Nelson R Burgos-Guntin
(74) *Attorney, Agent, or Firm* — Muncy, Geissler, Olds & Lowe, P.C.

(57) ABSTRACT

A sensor system for measuring pressure, temperature, force, or fill level, whereby an electrical plug connection is made especially robust and reliable for frequent, cyclic pivoting movements.

12 Claims, 7 Drawing Sheets

SENSOR SYSTEM WITH A ROTATABLE ELECTRICAL OUTLET

This nonprovisional application claims priority under 35 U.S.C. § 119(a) to German Patent Application No. 10 2015 006 890.3, which was filed in Germany on Jun. 3, 2015, and which is herein incorporated by reference.

BACKGROUND OF THE INVENTION

Field of the Invention

The invention relates to a sensor system with an improved electrical connector which is pivotable and especially robust.

SUMMARY OF THE INVENTION

It is an object of the invention to provide a cost-effective solution for an electrical connector of a sensor, which connector is to be made especially very compact but simultaneously is rotated often and cyclically. Moreover, a design is to be provided which meets high vibration requirements and in a very tight installation space as well assures the function thereof long-lastingly and robustly during use. Said objects are achieved with a system as is described in the independent claims.

It has emerged, furthermore, that when sensors are rotated around their main geometric orientation axis, an outgoing cable connection perpendicular thereto is subjected not only to kinking but simultaneously to tension as well. This promotes failures due to cable breakage with further use and the present invention intends to prevent such failures.

According to an embodiment of the invention, the sensor system has a rotatable electrical connector which is designed very compact outwardly, particularly in regard to a cyclic rotation requirement.

In this regard, a plug connection has been created for the first time, which brings the contact level of a plug connector for the transmission of sensor signals close to the central sensor axis, so that the kinking movement of the sensor cable can be reduced to a minimum and there need be no concern about cable breakage in very tightly dimensioned spaces as well.

It is possible to place the site of the plug connection and contacting zone in a region where shock and vibration peaks are minimized in particular by the orientation of the contacting plane relative to the entire sensor system.

This is particularly interesting in connection with load lifting hooks and locking hooks and force sensors, which find use in harsh environments and are utilized repeatedly on a daily basis, and therefore must function very reliably, particularly if persons could be present under the loads.

According to an embodiment of the invention, a sensor system can include the following for measuring pressure, temperature, force, and/or fill level: a sensor tip, which accommodates a sensor within itself; a sensor body, which accommodates at least one connection circuit board within itself and provides a sensor reading to the outside; and a pivotable electrical connector. The sensor reading can be provided to the outside electrically by the pivotable electrical connector and whereby an electrical detachable connection is provided at the pivotable electrical connector. According to an aspect of the invention, the pivotable electrical connector can be rotated relative to the sensor body about an axis, which runs through the sensor body.

According to an embodiment, the pivotable electrical connector can be rotated relative to the sensor body about an axis, which is articulated with an angle in the range of 5 to 35 degrees relative to a central extension axis of the sensor body.

According to an embodiment, the pivotable electrical connector can be rotated relative to the sensor body about an axis, which runs substantially parallel to a central extension axis of the sensor body and substantially parallel to a central extension axis of the sensor tip.

According to an embodiment, the pivotable electrical connector can be rotated relative to the sensor body about an axis, which runs substantially congruent to a central extension axis of the sensor body and substantially congruent to a central extension axis of the sensor tip.

According to an embodiment, the pivotable electrical connector can have a detachable electrical connection with plug contacts, whereby the plug contacts in their extension axis and/or plug-in direction are oriented substantially perpendicular to the pivot axis of the pivotable electrical connector.

According to an embodiment, the pivotable electrical connector can have a detachable electrical connection with plug contacts, whereby the plug contacts are arranged set back such that they are located within the extended or projected diameter of an installation space of the sensor body, or that the plane of the electrical contacting zone is at a distance of a maximum of 2 to 10 mm, preferably 4 to 7 mm, or 5 to 6 mm from the rotation axis of the pivotable electrical connector or of the sensor body.

According to an embodiment, the pivotable electrical connector can be pivoted about a pivot axis with an angle of a maximum of 180 degrees, 140 degrees, or preferably at an angle of 120 degrees.

According to an embodiment, the pivotable electrical connector can have a detachable electrical connection with plug contacts, whereby the preferably 4 to 5 provided plug contacts are tin-plated, silver-plated, or gold-plated, and whereby a mating connector can be secured via a securing mechanism, for example, with a union nut, to the detachable electrical plug connection of the pivotable electrical connector.

According to an embodiment, the electrical connection within the pivotable electrical connector can be created via stranded wires, which are arranged in a loop within the installation space of the pivotable electrical connector, or whereby the stranded wires at their ends are sealed in after soldering, or whereby the stranded wires are lubricated among one another to reduce friction.

According to an embodiment, the pivotable electrical connector can be mounted axially to the sensor body via a ball bearing.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
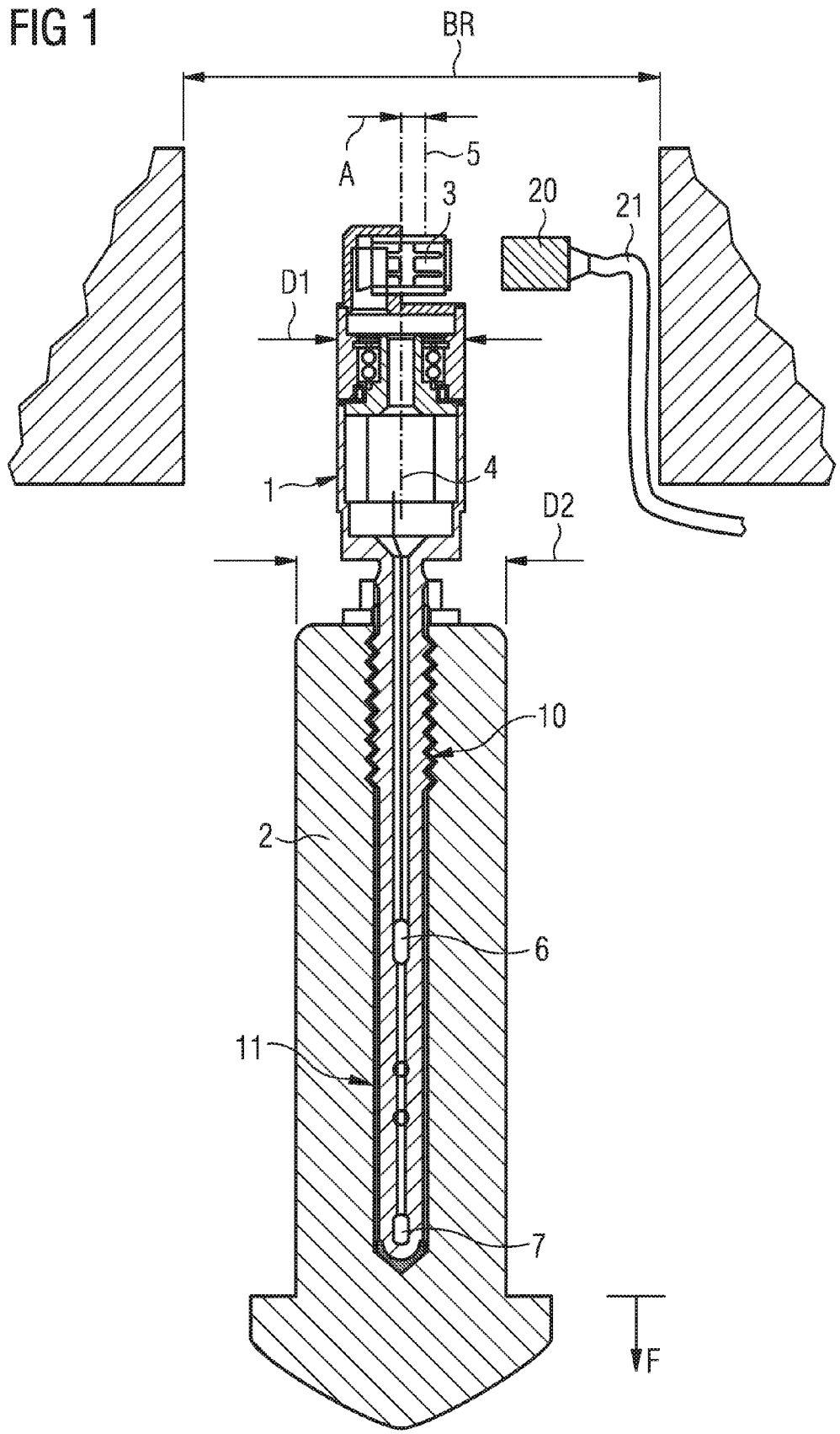
FIG. 1 shows a view of an exemplary embodiment of the sensor system.

FIG. 1 shows a principle view, in which sensor system 1 is screwed into a measuring element 2, here, for example, shown as a load hook, in a threaded zone 10.

The sensor system has a pivotable electrical connector 3 which rotates about central axis 4 of sensor system 1.

Sensor tip 11 of sensor system 1, which tip projects into a measuring element, carries, for example, a central strain sensor as a force sensor, or a temperature or pressure sensor 7 in its tip.

In particular, however, measuring element 2 has a diameter D2 between 30 and 100 mm, preferably 50 to 70 mm, and the sensor system has a smaller diameter D1 of 20 to 30 mm, preferably 25 to 26 mm, and the sensor system has a central axis 4 which is identical to that of the measuring element, and which at the same time is the rotation axis of electrical plug connector 3.

Contacting plane 5 of the plug connector, which is understood to be the middle of all contact points of the connector, in this case is at a distance of only 2 to 10 mm or 3 to 8 mm, preferably by 5.5 mm, from central axis 4 of the sensor system. A connector plug 20 can also be mounted very closely by this compact dimension A in a narrow installation space dimension BR of 150 to 400 mm; kinking and predamaging of a cable 21 during assembly can be minimized hereby, but particularly during operation, in the case of cyclic rotation of the measuring element/load bolt 2 the remaining space can be optimally utilized to enable relief of the cable also in the case of frequent pivoting movements.

The load hook in the example shown here is made to absorb a force F temporarily or permanently at protruding ends at the bottom end, whereby this is sensed via strains in the sensor and taken to a display outwardly via electronics and the sensor cable.

Figure 2:
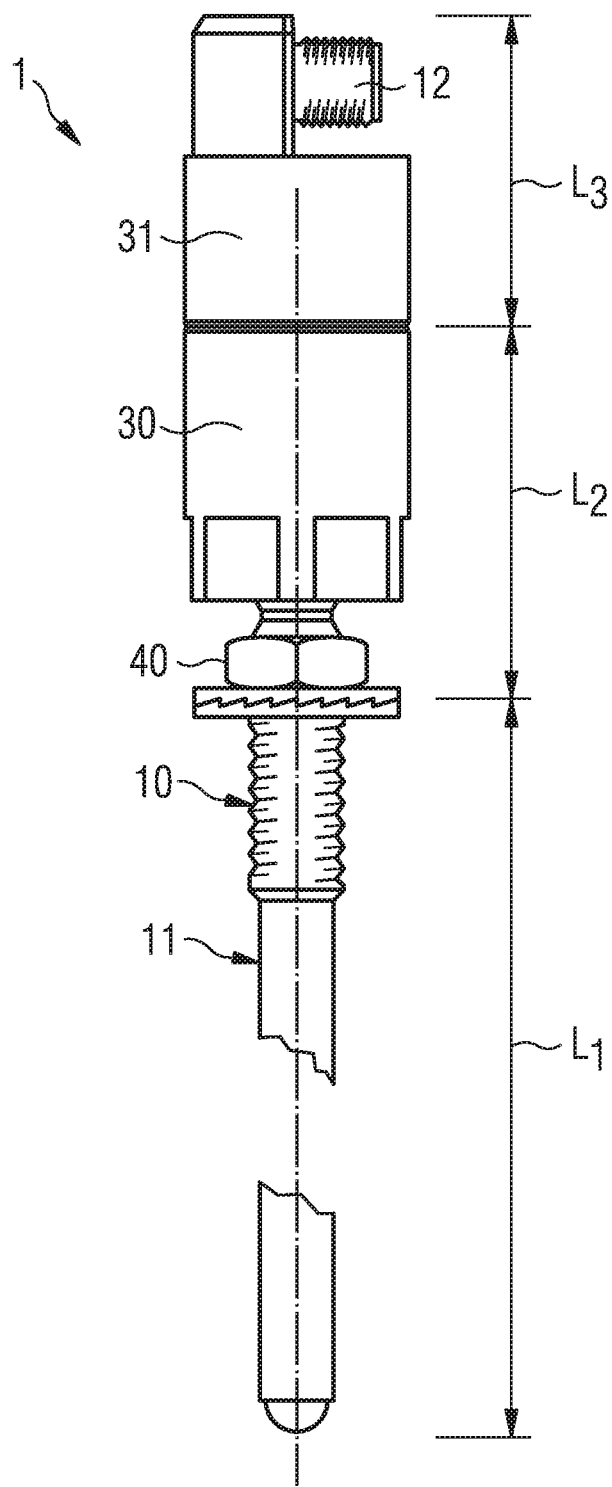
FIG. 2 shows a view of a further exemplary embodiment of the sensor system.

FIG. 2 is a principle view, which shows sensor system 1 separately outside a measuring element. It should be noted in particular that sensor tip 1 can have a length of L1=50-200 mm, 100-150 mm, or preferably 130 mm, whereby, however, the actual sensor body 30, which also accommodates an electronic measuring system, only has a height of L2=30-60 mm or 40-50 mm but preferably 48 to 50 mm, and the rotatable plug outlet has a height of L3=20-50 mm or 30-40, preferably 35 to 38 mm or 36 mm.

For the purpose of locking, fixing, and fastening, the sensor system has in addition a lock nut 40 on threaded section 10.

Pivotable electrical connector 39, formed as a rotatable electrical plug outlet, with pivoting housing 31 has in addition around the contacting zone an outer thread 12, which is preferably provided with M12.

Figure 3:
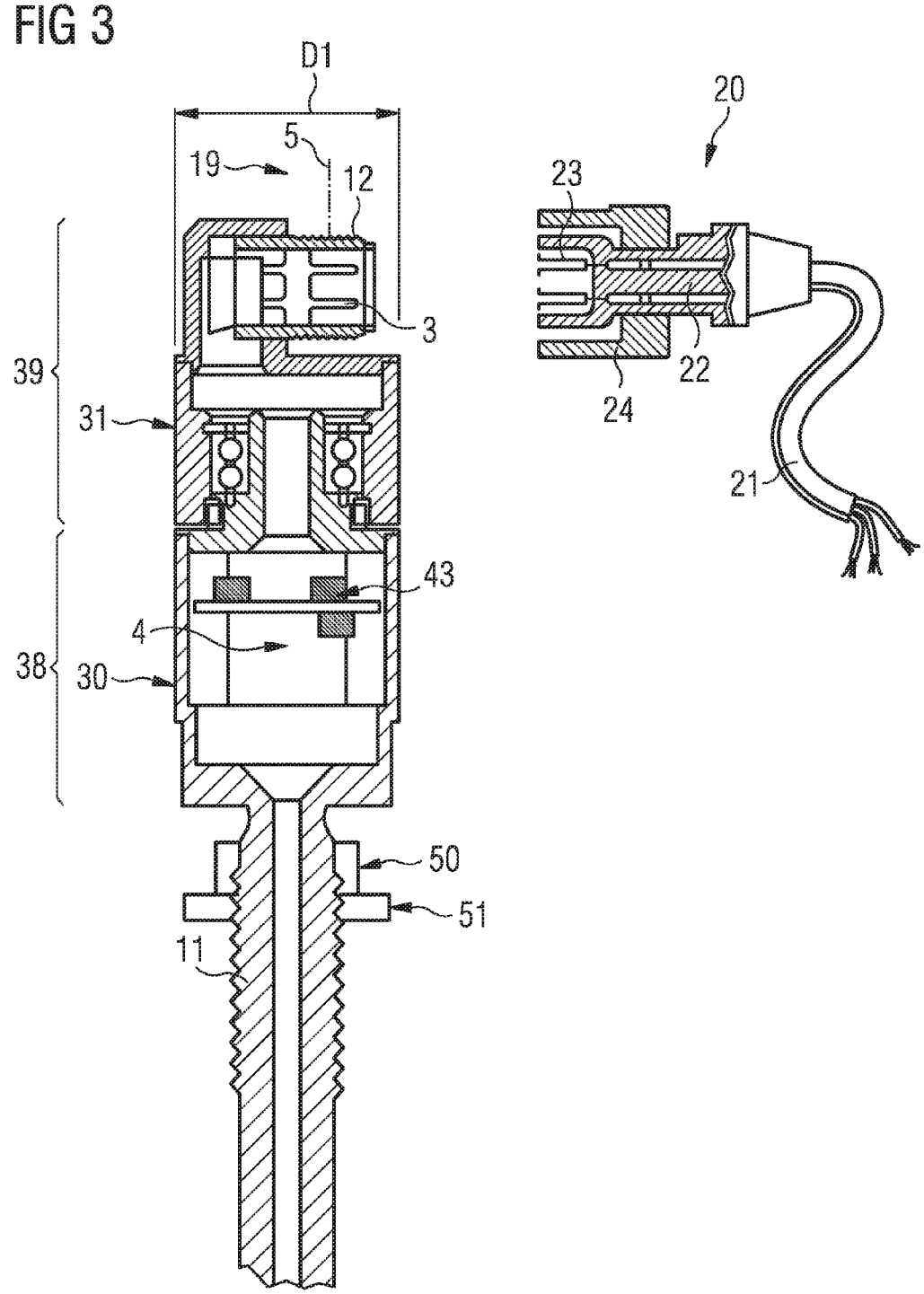
FIG. 3 shows a view of an exemplary embodiment of the sensor system.

FIG. 3 shows a sectional view of the sensor system with a commercial M12 sensor plug 20, which in its plug body 22 carries 4 or 5 socket contacts 23 overall with an additional shielding contact and continues these within cable 21 to stranded wires in a contacting manner.

An additional securing nut 24 enables the securing of the plug on the plug outlet of pivoting connector 31, or on the outer thread of electrical plug connection 12, which also surrounds the contacting plane.

The electrical detachable connection 12 with plug contacts 3 is arranged, particularly set back, on pivoting connector 39 in such a way that contact pins 3 and thus the electrical contacting zone are located within the extended diameter D1 of the installation space of sensor body 39.

More precisely, the position or plane of the electrical contacting zone is at a distance of at most 2-10 mm, preferably 4-7 mm, or 5-6 mm, from rotation axis 19 of pivoting connector 39 or axis 4 of sensor body 38. The contacting zone is therefore oriented very closely to the central axis of the sensor system, and experiences fewer vibrations in the case of vibration than if the plug connection were farther removed, e.g., fixed on the exterior of the housing.

The electrical detachable connection 12 preferably has 4 to 5 plug contacts 3, which are made tin-plated, but optionally also silver-plated or gold-plated for higher vibration requirements. In addition, mating connector 20 can be provided with an engaging union nut, which secures the detachable plug connection in addition against unintentional separation.

It is possible further to secure the sensor system additionally with a spring washer or toothed washer 51 and a lock nut 50 after screwing into a sensor element.

Figure 4:
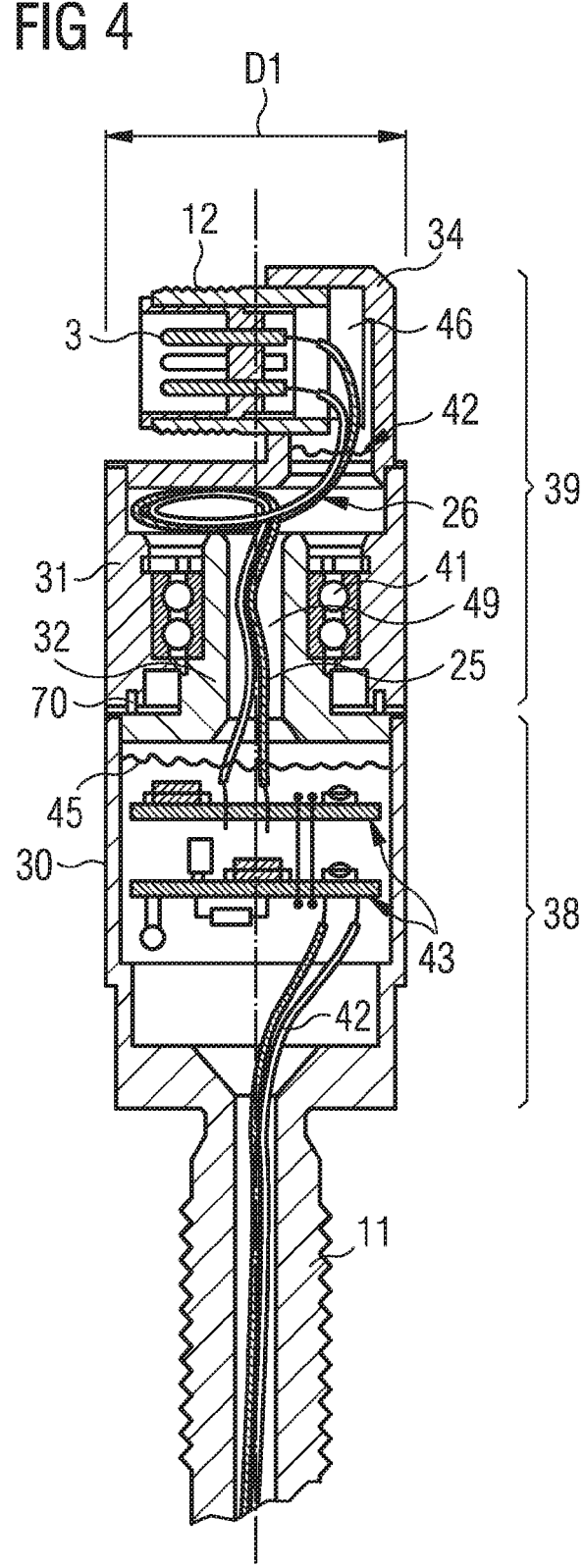
FIG. 4 shows a view of a further exemplary embodiment of the sensor system.

FIG. 4 shows the sensor system for measuring pressure, temperature, force, or fill level, comprising sensor tip 11 which as previously described can accommodate a sensor within itself, and comprising sensor body 38 formed substantially from sensor housing 31, which accommodates one or more connecting circuit boards 43 within itself and provides a sensor reading to the outside to a control room, a driver's cab, or a central reading monitoring unit, which can also be a safety device for cranes or hoists.

An electrical pivoting connector 39 is arranged in a rotatable manner above sensor body 38, whereby the sensor reading is provided outwardly electrically by the pivoting connector via stranded wire connections or with use of flat conductors (FPC) and whereby an electrical detachable connection in the form of a plug outlet with pin contacts is provided on the pivoting connector.

Pivoting connector 39 is formed from pivoting housing 31 with plug cap 34, whereby a bearing support 32, attached to the sensor housing, and placed ball bearing 41 with a hollow feed-through 49 for a stranded wire connection 25 to sensor body 38 fix the pivoting connector axially rotatably to sensor housing 30 which runs through the sensor body.

The ball bearing is sealed and thus also seals the sensor interior from the environment, but the bearing in particular assures a long-lasting, low-friction pivoting movement of the pivoting connector, so that in particular no jerky movements as well subject the plug connection or the outwardly relocated cable (FIG. 3, No. 21) to tension or kinking.

In addition, a sliding seal 70 can protect the sensor system from dust and dirt.

In order to secure the electrical connection further within the pivoting connector from breakage of stranded wires or vibration, stranded wires 26 within the installation space of housing 31 within the pivoting connector are arranged in a simple loop which is placed so that like a watch spring during rotation of the pivoting connector it can move toward and away from the sensor housing; i.e., the diameter of the loop can change.

The relative movement of the stranded wires to one another is greatly minimized in this way, and the lifetime of the electrical connection is maximized.

Furthermore, the connection is optimized in that the stranded wires in their connection region are sealed in at their ends after soldering. Thus, the upper installation space 46 of cap 34 is potted headfirst up to a level 42, and the bottom space of sensor housing 30 up to a level 45, namely, with a potting material which also surrounds the electronics and circuit boards 43 and thereby hardens or also remains elastic after potting, however, and thus stranded wire breakage at the exit from the potting is minimized further.

The stranded wires alternatively or in addition can be lubricated among one another against friction. In this case, a lubricant can be applied to the stranded wires before assembly or injected after assembly, for example, in the space accommodating the stranded wires.

Figure 5:
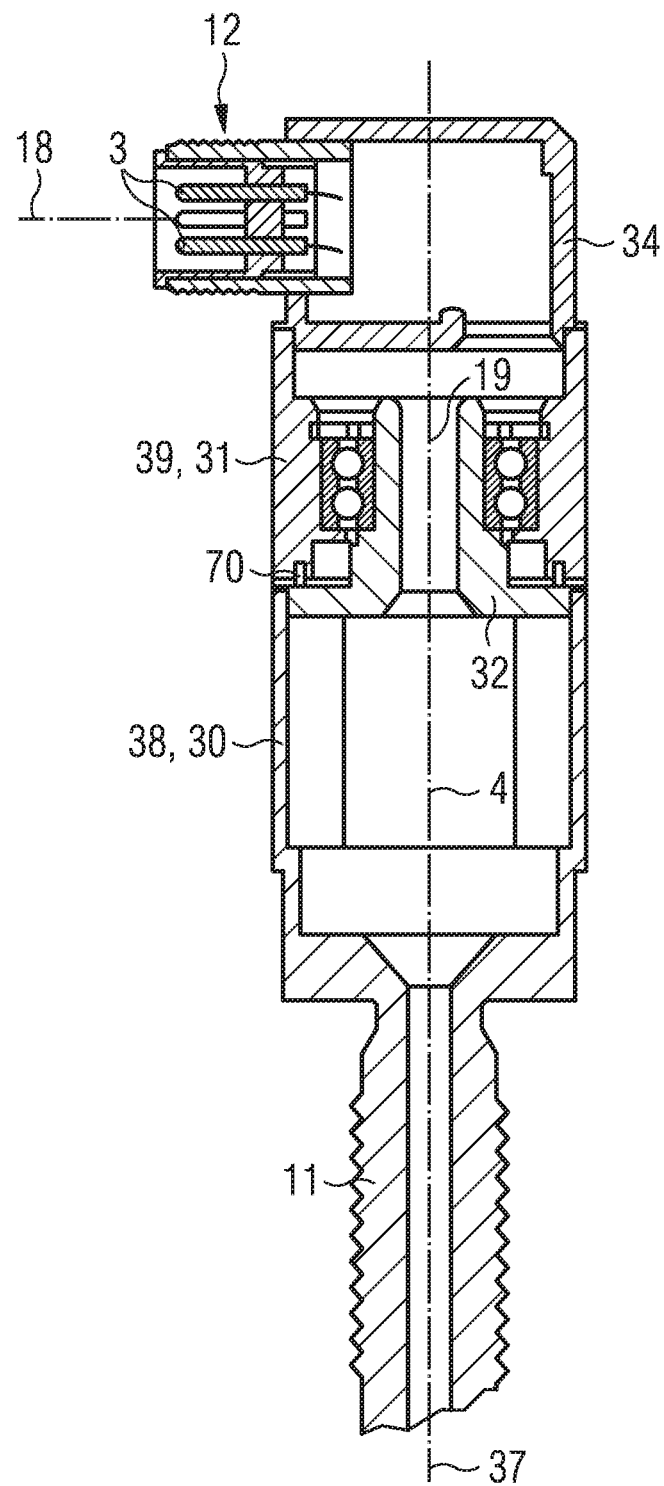
FIG. 5 shows a view of a further exemplary embodiment of the sensor system.

FIG. 5 shows the sensor system whereby pivoting connector 39 is rotatable relative to sensor body 38 about an axis, which can be parallel, here even congruent or identical to a central extension axis of sensor body 38 and congruent or alternatively runs parallel to a central extension axis of sensor tip 11.

In particular, the electrical detachable connection 12, attached to pivoting connector 39, is a plug connector with plug contacts 3, whereby the plug contacts are oriented in their extension axis and plug-in direction 18 perpendicular to pivoting axis 19 of pivoting connector 39.

In addition, in this embodiment, the plug contacts are located outside a continued cylinder or diameter with the circumference of sensor housing 30 or of pivoting connector 39. In this further embodiment, it is also conceivable, however, that the sensor system rotates repeatedly about its axis 4. For this purpose, a guiding out of the contact zone and of the ball bearing-mounted pivoting connector is helpful, because the torque or a tensile/force/bending load on the plug connection can be minimized in this way.

Figure 6:
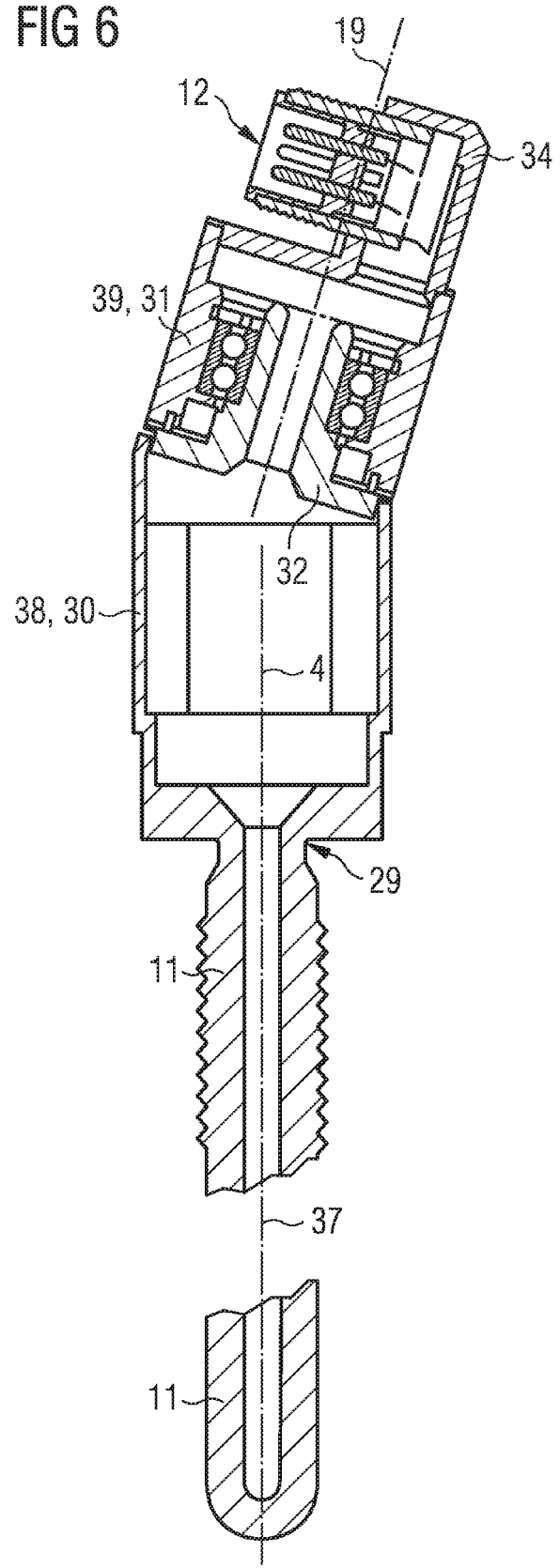
FIG. 6 shows a view of a further exemplary embodiment of the sensor system.

FIG. 6 shows pivoting connector 39 for sensor body 38 in a tilted position, whereby the pivoting connector can be rotated about an axis 19, which is articulated relative to central extension axis 4 of the sensor body between 5 and 35 degrees, preferably 20 degrees.

This is particularly helpful when connecting cables must be secured upwards later.

Optionally, extension axis 37 of sensor tip 11 can run congruent to a central extension axis 4 of sensor body 38, but this is also conceivable with an offset, to enable further installation space optimization for cable routing.

Thus, it is also conceivable that in region 29 sensor tip 11 does not join sensor housing 30 centrally, but is attached with an offset.

Figure 7:
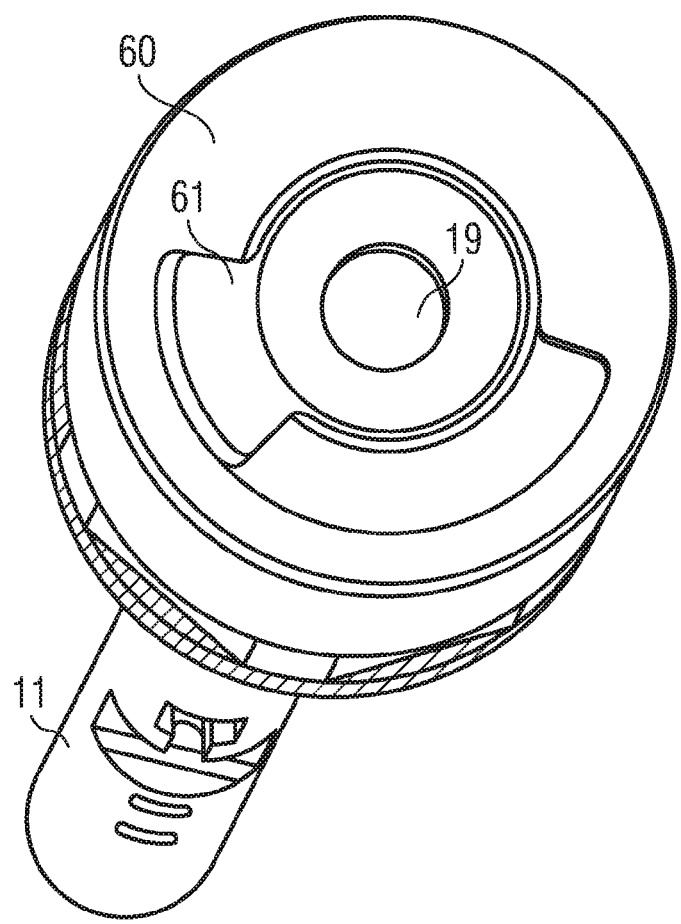
FIG. 7 shows an option for limiting a pivot angle of the pivoting connector.

FIG. 7 shows one of many options for how a pivot angle of the pivoting connector can be limited:

Here, this is realized by 2 milled or stamped parts, which due to a suitable free space to one another allow a pivot angle of a maximum of 180 degrees, 140 degrees, or preferably an angle of 120 degrees.

Likewise, this can also be realized by a pin stop in a kidney-shaped form of the counterpart or to another stop.

The invention is not limited to the foregoing detailed exemplary embodiments. It can be modified within the scope of the following claims. Likewise, individual aspects from the dependent claims can be combined with one another.

What is claimed is:

1. A sensor system for measuring pressure, temperature, force, and/or fill level, the sensor system comprising:
   a sensor tip that accommodates a sensor within the sensor tip;
   a sensor body that accommodates at least one connection circuit board within the sensor body and provides a sensor reading externally;
   a pivotable electrical connector, the sensor reading being electrically provided externally by the pivotable electrical connector; and
   an electrical detachable connector arranged at the pivotable electrical connector,
   wherein the pivotable electrical connector is rotatable relative to the sensor body about an axis.

2. The sensor system according to claim 1, wherein the pivotable electrical connector is rotatable relative to the sensor body about the axis that is articulated with an angle in a range of 5 to 35 degrees relative to a central extension axis of the sensor body.

3. The sensor system according to claim 1, wherein the pivotable electrical connector is rotatable relative to the sensor body about the axis that runs substantially parallel to a central extension axis of the sensor body and substantially parallel to a central extension axis of the sensor tip.

4. The sensor system according to claim 1, wherein the pivotable electrical connector is rotatable relative to the sensor body about the axis that runs substantially congruent to a central extension axis of the sensor body and substantially congruent to a central extension axis of the sensor tip.

5. The sensor system according to claim 1, wherein the electrical detachable connector has plug contacts, and wherein the plug contacts, in their extension axis and/or plug-in direction, are oriented substantially perpendicular to the axis of the pivotable electrical connector.

6. The sensor system according to claim 1, wherein the electrical detachable connector has plug contacts, and wherein the plug contacts are arranged set back such that they are located within the extended or projected diameter of an installation space of the sensor body or that a plane of an electrical contacting zone is at a distance of a maximum of 2 to 10 mm, 4 to 7 mm, or 5 to 6 mm from the rotation axis of the pivotable electrical connector or of the sensor body.

7. The sensor system according to claim 1, wherein the pivotable electrical connector is pivotable about the axis with an angle of a maximum of 180 degrees, 140 degrees, or at an angle of 120 degrees.

8. The sensor system according to claim 1, wherein the electrical detachable connector has plug contacts, and a portion of the plug contacts are tin-plated, silver-plated, or gold-plated, and wherein a mating connector is secured via a securing mechanism or a union nut to the electrical detachable connector of the pivotable electrical connector.

9. The sensor system according to claim 1, wherein an electrical connection within the pivotable electrical connector is created via stranded wires, which are arranged in a loop within the installation space of the pivotable electrical connector, or wherein the stranded wires at their ends are sealed in after soldering or wherein the stranded wires are lubricated among one another to reduce friction.

10. The sensor system according to claim 1, wherein the pivotable electrical connector is mounted axially to the sensor body via a ball bearing.

11. The sensor system according to claim 10, wherein the ball bearing is positioned inside of the pivotable electrical connector.

12. The sensor system according to claim 1, wherein a plug cap is provided on an upper surface of the pivotable electrical connector and the electrical detachable connector is inserted into the plug cap.

* * * * *